United States Patent
Aaron

(10) Patent No.: US 8,112,639 B2
(45) Date of Patent: *Feb. 7, 2012

(54) METHODS, SYSTEMS AND COMPUTER PROGRAM PRODUCTS FOR DETECTING TAMPERING OF ELECTRONIC EQUIPMENT BASED ON CONSTRAINED TIME TO OBTAIN COMPUTATIONAL RESULT

(75) Inventor: Jeffrey A. Aaron, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 264 days.

This patent is subject to a terminal disclaimer.

(21) Appl. No.: 12/508,125

(22) Filed: Jul. 23, 2009

(65) Prior Publication Data

US 2009/0282269 A1 Nov. 12, 2009

Related U.S. Application Data

(63) Continuation of application No. 10/866,917, filed on Jul. 8, 2004, now Pat. No. 7,584,366.

(51) Int. Cl.
*G06F 11/30* (2006.01)

(52) U.S. Cl. .................................. 713/194; 713/189
(58) Field of Classification Search .................. None
See application file for complete search history.

(56) References Cited

U.S. PATENT DOCUMENTS

| | | | |
|---|---|---|---|
| 6,026,293 A | 2/2000 | Osborn | |
| 6,550,010 B1 | 4/2003 | Link, II et al. | |
| 7,184,527 B1 | 2/2007 | Lin et al. | |
| 7,212,649 B2 | 5/2007 | Watanabe et al. | |
| 7,581,103 B2 * | 8/2009 | Home et al. | 713/176 |

* cited by examiner

*Primary Examiner* — Pramila Parthasarathy
(74) *Attorney, Agent, or Firm* — Myers Bigel Sibley & Sajovec, P.A.

(57) ABSTRACT

Tampering of electronic equipment may be detected by instructing the electronic equipment to perform at least one computational operation at the electronic equipment, such as hashing of at least some of the memory of the electronic equipment, to produce a result. The result is received from the electronic equipment. Tampering of the electronic equipment is detected if the result is not received within a constrained time of the instructing, even if the result is correct. Tampering also may be detected if the result is not correct.

20 Claims, 3 Drawing Sheets

METHODS, SYSTEMS AND COMPUTER PROGRAM PRODUCTS FOR DETECTING TAMPERING OF ELECTRONIC EQUIPMENT BASED ON CONSTRAINED TIME TO OBTAIN COMPUTATIONAL RESULT

CROSS-REFERENCE TO RELATED APPLICATION

This application is a continuation of U.S. application Ser. No. 10/886,917, filed Jul. 8, 2004 now U.S. Pat. No. 7,584, 366, entitled Methods, Systems and Computer Program Products for Detecting Tampering of Electronic Equipment Based on Constrained Time to Obtain Computational Result, assigned to the assignee of the present application, the disclosure of which is hereby incorporated herein by reference in its entirety as if set forth fully herein.

FIELD OF THE INVENTION

This invention relates to electronic equipment that performs computational operations, and more particularly to methods, systems and computer program products for detecting tampering of electronic equipment.

BACKGROUND OF THE INVENTION

Electronic equipment is widely used to perform various functions including computational operations. As used herein, the term "electronic equipment" refers to any equipment with computational capability. Accordingly, as used herein, electronic equipment can include one or more enterprise, application, personal, pervasive and/or embedded computer systems that perform computational operations. Examples of electronic equipment, as used herein, include computer workstations, modems, personal digital assistants, cell phones, email i-pagers, and computer-controlled appliances, such as set-top boxes, microwave ovens, televisions, MP3 players and digital video recorders.

Electronic equipment may be tampered with, such that their operating software/firmware, application software and/or data contained in the equipment is altered, via direct and/or remote access. It may be extremely difficult and, perhaps, even theoretically impossible, to prevent this tampering, especially when the electronic equipment is located in an area to which potential hackers may have actual physical access, such as a business or a home. This susceptibility to tampering can affect the degree to which the device can be trusted.

It may be difficult to detect whether such tampering has occurred, because once electronic equipment is tampered with, it may be possible for the attacker who has performed the tampering to alter the electronic equipment's software/firmware to include particular functionality such that any checks are actively fooled by the altered operation of the compromised electronic equipment.

SUMMARY OF THE INVENTION

Tampering of electronic equipment may be detected, according to some embodiments of the present invention, by instructing the electronic equipment to perform at least one computational operation at the electronic equipment, to produce a result, and receiving the result from the electronic equipment. Tampering of the electronic equipment is detected if the result is not received within a constrained time of the instructing, even if the result is correct. In other embodiments, tampering also may be detected if the result is not correct. In some embodiments, the electronic equipment may be disconnected from the network by which it communicates and/or is at least partially disabled upon detecting tampering.

In some embodiments, the electronic equipment includes memory and the electronic equipment is instructed to perform at least one hashing operation of contents of at least a portion of the memory, to produce at least one hash value as the result. In other embodiments, the electronic equipment is instructed to hash contents of a second portion of the memory with a hash of contents of a first portion of the memory, to produce at least one hash value as a result. The first and second portions of the memory may be sequential or non-sequential portions of same or different sizes that overlap or are non-overlapping. Moreover, in some embodiments, a portion of the memory that may be subject to tampering is determined, and the electronic equipment is instructed to perform at least one hashing operation of contents of the portion of the memory that may be subject to tampering. In still other embodiments, instructing the electronic equipment and receiving results are performed repeatedly. Tampering of the equipment is detected if at least one of the results is not received within a constrained time of the instructing, even if the result is correct.

In some embodiments of the invention, the constrained time is determined by determining a first time to instruct the electronic equipment to perform at least one computational operation, determining a second time to perform at least one computational operation at the electronic equipment, and determining a third time to receive the result from the electronic equipment. Tampering is detected if the result is not received within a constrained time that is a function of the first, second and third times, even if the result is correct. In some embodiments, the function of the first, second and third times is a sum of the first, second and third times multiplied by an extra time margin.

In still other embodiments, the electronic equipment is also provided with additional data to be stored in the memory thereof, and the electronic equipment is instructed to perform at least one hashing operation of contents of at least a portion of the memory and of the additional data stored in the memory, to produce at least one hash value as the result. In some embodiments, the additional data that is provided is sufficiently large to prevent mirroring of the contents of at least a portion of the memory, in the memory.

In other embodiments, prior to instructing the electronic equipment to perform at least one computational operation, a plurality of computational operations and a corresponding plurality of results are defined for corresponding classes of electronic equipment. The class of the electronic equipment to be tested is identified and the electronic equipment is instructed to perform at least one computational operation, based on the class to which the electronic equipment belongs.

Embodiments of the invention have been described above primarily with respect to methods of detecting tampering of electronic equipment. However, other embodiments of the invention can provide systems for detecting tampering of electronic equipment and computer program products that may be used to detect tampering of electronic equipment. Other methods and/or computer program products according to other embodiments of the invention will be or become apparent to one with skill in the art upon review of the following drawings and detailed description. It is intended that all such additional methods and/or computer program products be included within this description, be within the scope of the present invention, and be protected by the accompanying claims.

DETAILED DESCRIPTION

Figure 1:
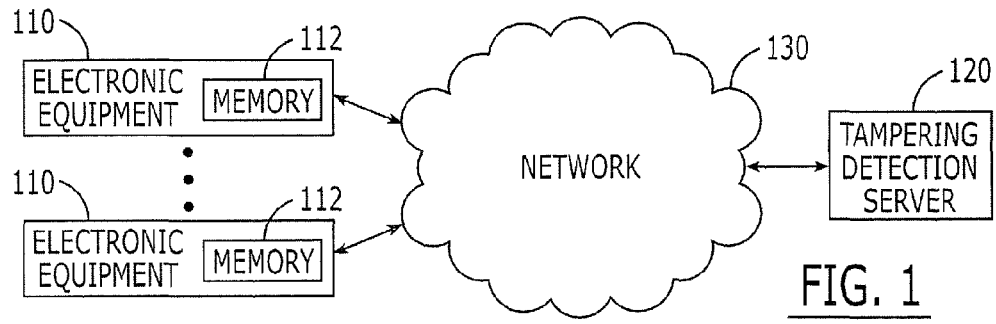
FIG. 1 is a block diagram of systems, methods and/or computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises"and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a non-transitory computer-usable or computer-readable storage medium having computer-usable or computer-readable program code embodied in the non-transitory medium for use by or in connection with an instruction execution system. In the context of this document, a non-transitory computer-usable or computer-readable medium may be any non-transitory medium that can contain, store, communicate, propagate, or transport the program for use by or in connection with the instruction execution system, apparatus, or device.

The non-transitory computer-usable or computer-readable medium may be, for example but not limited to, an electronic, magnetic, optical, electromagnetic, infrared, or semiconductor system, apparatus, device, or non-transitory propagation medium. More specific examples (a non-exhaustive list) of the non-transitory computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable non-transitory medium upon which the program is printed, as the program can be electronically captured, via, for instance, optical scanning of the paper or other non-transitory medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

FIG. 1 is a block diagram of systems, methods and/or computer program products for detecting tampering of electronic equipment, according to various embodiments of the present invention. As shown in FIG. 1, one or more pieces of electronic equipment 110 is connected to a tampering detection server 120 via a network 130. It will be understood that the tampering detection server 120 may be embodied as one or more enterprise, application, personal, pervasive and/or embedded computing device that may be interconnected by a wired and/or wireless local and/or wide area network, including the Internet. The network 130 can include one or more wired and/or wireless local and/or wide area networks including the Internet. As also shown in FIG. 1, the electronic equipment 110 includes memory 112. As is well known to those having skill in the art, the memory 112 is representative of the overall hierarchy of memory devices, which can include one or more read-only memories and/or read-write memories containing content that is used to control the electronic equipment 110 and/or implement the functionality of the electronic equipment 110. The memory 112 may include several categories of the content used in the electronic equipment 110, such as an operating system(s), application program(s) and/or data.

According to some embodiments of the present invention, systems, methods and/or computer program products may be provided that can detect, with potentially high relative certainty, whether or not tampering has occurred, in a manner that can actively force constraints of the electronic equipment being checked, such that changes in the electronic equipment's operation that may be caused by software, firmware and/or hardware hacking should not be able to fool the tampering detection.

Figure 2:
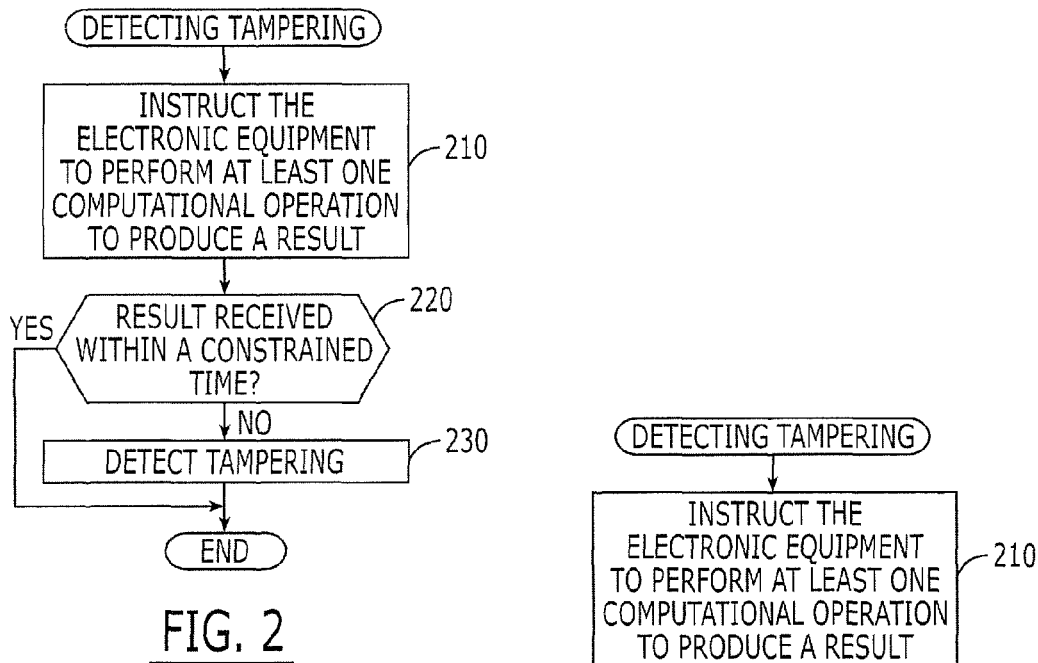
FIGS. 2-4 are flowcharts of operations that may be performed according to various embodiments of the present invention.

FIG. 2 is a flowchart of operations that may be performed for detecting tampering of electronic equipment according to some embodiments of the present invention. These operations may be performed, for example, by a tampering detection server 120 of FIG. 1, in connection with one or more pieces of electronic equipment 110.

In particular, referring to FIG. 2, at Block 210, the electronic equipment 110 is instructed to perform at least one computational operation to produce a result. This instruction may be transmitted by the tampering detection server 120 over the network 130, in the form of JAVA applet, object, computer program, packet and/or other conventional technique for instructing electronic equipment to perform at least one computational operation. At Block 220, a determination is made by the tampering detection server 120 as to whether the result was received within a constrained time. At Block 230, tampering of the electronic equipment 110 is detected if the result is not received within the constrained time of the instructing, even if the result is correct.

Figure 3:
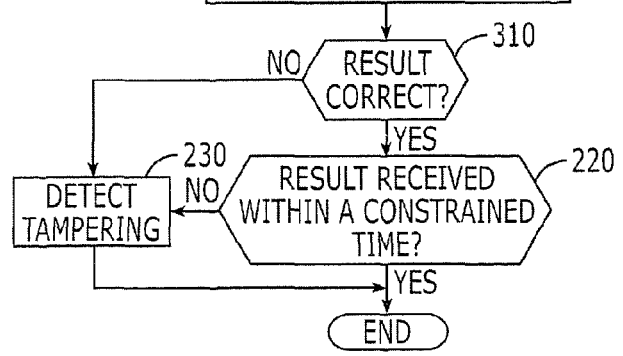

FIG. 3 is a flowchart of operations that may be performed according to other embodiments of the present invention. In FIG. 3, tampering is detected at Block 230 if the result is not correct at Block 310. Tampering is also detected at Block 220 if the result is not received within a constrained time, even if the result is correct.

Figure 4:
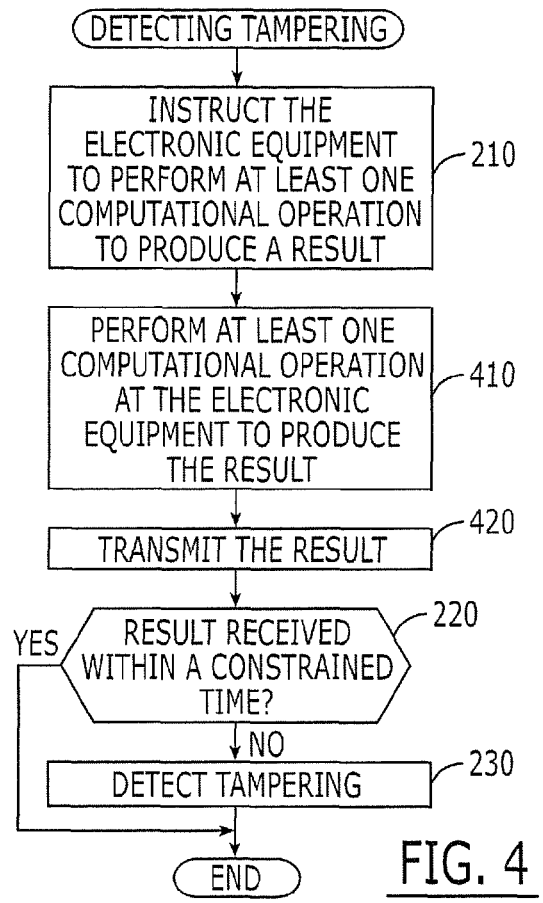

FIG. 4 is a flowchart of other operations for detecting tampering according to other embodiments of the present invention. In FIG. 4, after the instructions are received at the electronic equipment 110 at Block 210, the at least one computational operation is performed at the electronic equipment, to produce the result at Block 410. The result is transmitted at Block 420, for example over the network 130, to the tampering detection server 120. The test of Block 220 is then made, and tampering is detected at Block 230, as was already described. It will also be understood that combinations and subcombinations of embodiments of FIG. 2-4 may be provided according to various embodiments of the invention.

Additional discussion of embodiments of FIGS. 1-4 now will be provided. In particular, in some embodiments, at Block 210, the computational operation may be at least one hashing operation of contents of at least a portion of the memory 112 of the electronic equipment 110, to produce at least one hash value as the result. A simple hash of a single portion of the memory 112 may be performed or contents of a second portion of the memory 112 may be hashed with a hash of contents of a first portion of the memory 112, to produce at least one hash value as the result. The first and second portions of the memory 112 may be sequential or non-sequential portions, of same or different sizes that overlap or are non-overlapping. Iterative hashing of portions of the memory 112 also may be performed. Accordingly, a range of computational operations from fairly simple to highly complex may be performed to obtain the result. Moreover, in some embodiments, prior to instructing at Block 210, a portion of the memory 112 that may be subject to tampering may be determined, so that the electronic equipment 110 can be instructed to perform at least one hashing operation of contents of the portion of the memory 112 that may be subject to tampering, to produce at least one hash value as the result.

In yet other embodiments, the instructing at Block 210 may also provide the electronic equipment 110 with additional data to be stored in the memory 112. The electronic equipment 110 may be instructed to perform at least one hashing operation of contents of at least a portion of the memory 112 and of the additional data stored in the memory 112, to produce at least one hash value as the result. The additional data may be sufficiently large, in some embodiments, so as to reduce or prevent mirroring of the contents of at least a portion of the memory 112, in the memory 112.

In other embodiments, the constrained time of Block 220 may take into account (be a function of) a time to transmit the instruction from the tampering detection server 120 across the network 130 to the electronic equipment 110, a time that is used by the electronic equipment 110 to perform the computational operation, and a time to transmit the results back to the tampering detection server 120 across the network 130. These three times can be a summed to obtain the constrained time. In other embodiments, an extra time margin may be added to account for acceptable variations of these times.

In still other embodiments, simultaneous with or prior to the instructing of Block 210, the electronic equipment 110 may be at least temporarily disabled from performing other computations other than the at least one computational operation, so that the time to perform the computation may be accurately determined without interference by other operations that may take place in the electronic equipment. In other embodiments, the operations of FIGS. 2, 3 and/or 4 may be performed and failed repeatedly in order for tampering to be declared. Thus, if results are not received within a constrained time and/or incorrect results are received, the testing can be performed a predetermined number of additional times before a determination is made that tampering is present. If tampering is detected at Block 230, the electronic equipment 110 may be disconnected from the network by which it communicates and/or at least partially disabled. Disabling or disconnection may occur by sending a message to the electronic equipment 110 and/or by sending a technician to manually disable the electronic equipment 110.

In still other embodiments, prior to instructing the electronic equipment 110 at Block 210, the tampering detection server 120 may define a plurality of computational operations and a corresponding plurality of results for corresponding classes of electronic equipment 110. A class of the electronic equipment 110 to be tested is then determined, and the instructions are provided to the electronic equipment 110 to be tested based on the class to which it belongs. More specifically, in some embodiments of the present invention, a set of computational operations may be generated, having processing times that can range from a low to a high, encompassing the computational abilities of the electronic equipment 110 to be checked. For a particular piece of electronic equipment 110, a particular computational operation or checking process may be specified. A test is then made at Block 220 as to whether the result is received within a constrained time of the instructing, also referred to herein as an Allowed Time Period (ATP). The result should be able to be computed within that constrained time, but with only a relatively small time margin, so that it is not conducive to fooling the check, which may take significantly longer to accomplish. In some embodiments, the memory 112 and/or other electronic equipment activity may be constrained while the electronic equipment 110 is performing the computations. Moreover, in some embodiments, the computational operations can be selected to ignore data in the memory 112 that is meant to be highly variable, temporary, insignificant to operation, etc.

If the electronic equipment 110 has not be tampered with, the result is computed and responded to within the constrained time. In contrast, "fooling" the check may take a significantly greater time period, for example twice as long, so that fooling the check may be detected. If a valid result is obtained at Block 220, then tampering is not present. If a valid result is not obtained at Block 220, then, assuming the computational operations are working correctly, tampering is present and the electronic equipment 110 may no longer be trusted.

As was described above, some embodiments of the present invention may employ hashing operations. As used herein, the term "hash" includes, but is not limited to, a mathematical algorithm or other relationship that is used to relate input information to output information. For example, input information may be hashed by performing an exclusive-OR (XOR)-based operation on bytes of the input information to generate a fixed-size output value (e.g., a binary string). Thus, for example, hashing two identical strings will generate the same hash values, while hashing two non-identical strings can generate different hash values. Hashing may be carried out using standard cryptographic algorithms where hashing of two identical information strings generates the same hash value(s), which hashing of two non-identical information strings generates different hash values. Exemplary hash algorithms that may be used with some embodiments of the invention include Secure Hash Algorithms (e.g., SHA-1) and/or Message Digest (e.g., MD2, MD4, and MD5) algorithms.

In some embodiments, the at least one computational operation is a hash of at least some of the software/firmware that is stored in the memory 112 of the electronic equipment 110, in any desired combination, the results of which are compared with a previously calculated hash result of a valid, non-tampered sample of the electronic equipment 110. Different hash results indicate tampering, whereas equal hash results indicate that there has been no change. The previously calculated hash result may be calculated by the electronic equipment 110 or by the tampering detection server 120.

Complex and/or iterative hashes may be performed according to other embodiments of the present invention. For example, a small portion of the total memory 112, such as 10% of the total memory 112, may be hashed. Then, a hash of that hash result may be performed, concatenated with the second tenth of the total memory 112. That result is continued to be hashed along with successive results, until the entire memory 112 or a desired portion of the memory 112 has been hashed, leaving one final hash result. Generally, the more iterations, the longer it may take to perform the operations and receive a final result. Moreover, hashing generally is computationally intensive, so that each hash computation may take a significant processing time on the electronic equipment 110.

In other embodiments, iterative successive hashes may be performed, but not on sequential portions of the total software/firmware dataset in the memory 112. Rather, hashes may be performed in reverse order or any other definable order. Iterative successive hashes also may be performed on unequal portions of the memory 112 or a portion thereof in any definable fashion. Moreover, iterative successive hashes may be performed on continuous, discontinuous and/or overlapping portions of the memory 112 in any defined fashion.

It will also be understood that if the electronic equipment 110 is busy with other computations, tampering may not be successfully detected, because the prior estimate of processing time for performing the computation may not apply. The computational operations may not be able to complete until after the constrained time, even if tampering is not present, due to the electronic equipment 110 being busy with other computations. According to some embodiments, the electronic equipment 110 may be temporarily monopolized by, for example, suspending all other computations while the computational operations are being executed in response to the instructions.

Many other variations of the computational operations of Block 220 may be provided according to various embodiments of the present invention. For example, the specific instructions for hashing can be more or less efficient, such that they take more or less time to compute. Algorithms may be readily modified to result in longer computing times, in contrast with conventional approaches that may attempt to make computational algorithms more efficient. In some embodiments, the modifications should result in a different hash result than the unmodified hash algorithm because, otherwise, a hacker could use the unmodified hash algorithm to compute the same result in a shorter time period, potentially so as to fool the tampering detection.

In other embodiments, parameters may be used to describe iterative hashing, such as a divisor parameter to determine the percent of the memory 112 to hash in each iteration, which could be ten (10) in some embodiments. In some embodiments, this divisor parameter may also indicate the number of iterations to determine the final result. The greater the divisor, the more iterations and the longer it generally may take to compute the final result. The divisor may be chosen as desired in order to adjust the computational time, without potentially impacting the inherent qualities of hashing. Parameters may also be used to describe or define the order of iterative successive hashing, the size of each portion of the total software/firmware dataset in the memory 112, and/or any overlapping of the portions.

Referring again to Block 220, the constrained time, according to some embodiments of the present invention, may be sum of three time periods: a first time $T_a$, to communicate the instructions from the tampering detection server 120 to the electronic equipment 110 across the network 130; a second time $T_b$ for the electronic equipment 110 to perform the at least one computational operation; and a third time $T_c$ to communicate the result from the electronic equipment 110 back across the network 130 to the tampering detection server 120. An extra time margin also may be provided, to allow for computational variations in the electronic equipment 110 and/or network transit times. If the margin is 33%, then the constrained time for a response to be received is 1.33% $\{T_a + T_b + T_c\}$. Continuing with the above example, if it is estimated that the computational operations could be fooled if the margin is 80%, then it is highly unlikely that the tampering detection can be fooled within the 33% margin. In some embodiments, the margin may be selected such that fooling the tampering detection would take 25% longer than the margin, in order to provide sufficient confidence. However, the value of the margin may be configurable from this default value.

Many different variations of the at least one computational operation may be used to impact the processing time and/or complexity at the electronic equipment 110, if so desired. For example, less computationally efficient algorithms or versions may be used. Increased iterative hashing also may be used, for example by varying the parameters describing the number of iterative hash computations and/or the portion of the total memory 112 being hashed in each iteration. Overlap of portions of the total software/firmware dataset in the memory 112 also may be used in the iterative successive hashing, where increasing the total overlap (for example the sum of all individual portion overlaps) can increase the total processing time. The actual number of overlap portions can be much greater than the divisor value which sets the number of non-overlapped (contiguous) portions which can enable very precise and very large relative increases in processing time if desired. Still other embodiments can decrease the processing time to perform the at least one computational operation at the electronic equipment 110. More computationally efficient algorithms or versions may be used. Fewer iterations of hashing may be used, and the overlap of portions of the total software/firmware dataset in the memory 112 may be decreased.

Moreover, as was described above, in some embodiments of the present invention, the electronic equipment 110 may also be provided with additional data to be stored in the memory 112, and the electronic equipment 110 may be instructed to perform at least one hashing operation of contents of at least a portion of the memory 112 and of the data stored in the memory 112, to produce at least one hash value as the result. The data can be sufficiently large to prevent mirroring of the contents of at least a portion of the memory 112, in the memory 112.

More specifically, if a hacker can merely store or mirror the original software/firmware as a whole or, perhaps, in major portions, referred to herein as an "image", then tampering detection might be fooled because the hacker could hijack and apply the check process to the stored images rather than to the now-compromised software/firmware actually controlling the tampered electronic equipment 110. This might allow a hacker to complete the check process within the constrained time period with the proper result, by hashing the stored image(s) rather than actual tampered software/firmware in use.

Accordingly, in some embodiments of the present invention, just as the value of the expected processing time is stored for each electronic equipment 110 type and configuration, the value of the available memory 112 can be stored in a database as well. Then, an appropriate amount of randomly-generated data can be appended to the total software/firmware dataset in the memory 112 prior to hashing. Thus, a sufficiently large portion of memory 112 may need to be utilized in the computational process itself, such that storage of software/firmware images as described above simply cannot be supported simultaneously in the equipment, due to the resulting forced lack of available memory 112. The randomly-generated data, which may be arranged to be unique to each one of the electronic equipment 110 and each time tampering detection is performed, may be stored in a database as long as needed in order to properly compare previous and current hash values that result from the computational process.

Figure 5:
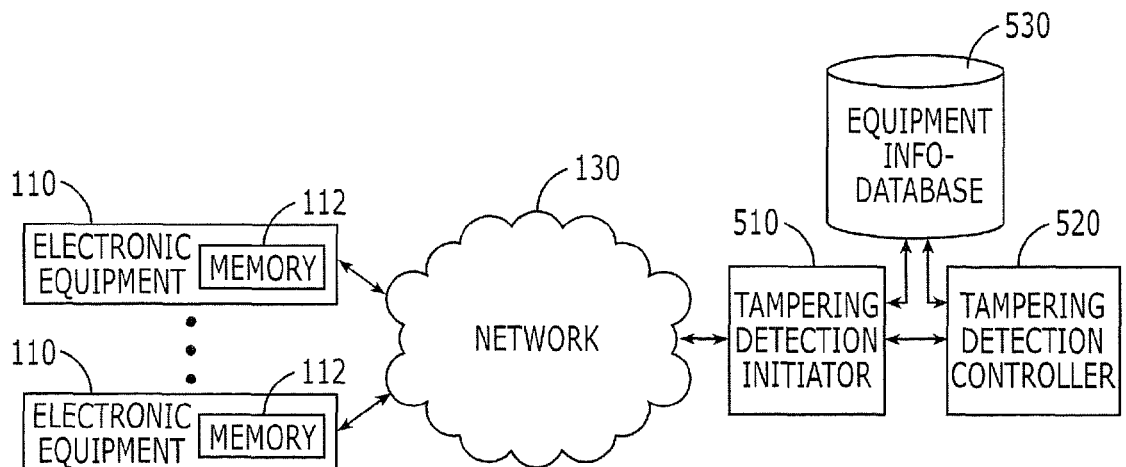
FIG. 5 is a block diagram of systems, methods and/or computer program products according to various other embodiments of the present invention.

FIG. 5 is a block diagram of systems, methods and computer program products according to various other embodiments of the present invention. In embodiments of FIG. 5, the functionality of tampering detection, such as a tampering detection server 120 of FIG. 1, may be provided by three functional components: a tampering detection initiator 510, a tampering detection controller 520, and an equipment information database 530. Each of the elements 510, 520 and 530 may be embodied by one or more enterprise, application, personal, pervasive and/or embedded computing devices that may be interconnected by a local and/or wide area wired and/or wireless network, including the Internet. Moreover, the functionality of any of these components, or combinations/subcombinations thereof, may be combined into a single component.

More specifically, in some embodiments, the tampering detection initiator 510 instructs the electronic equipment 110 to perform at least one computational operation at the electronic equipment 110 to produce a result. Along with the instructions, parameters may be provided as well as additional data, as was described above. The tampering detection initiator 510 also receives the results from the electronic equipment 110, and forwards the results to the tampering detection controller 520.

The equipment information database 530 can store a listing of electronic equipment computation capabilities by class of electronic equipment (such as model/version/serial number), and electronic equipment memory capabilities. Random data to be appended to each piece of electronic equipment 110 also may be stored in the equipment information database 530.

Finally, the tampering detection controller 520 can select a piece of electronic equipment 110 to check, and access the information relative thereto from the equipment information database 530. The instructions and parameters may be selected and passed to the tampering detection initiator 510. Random data to be added also may be passed to the tampering detection initiator 510 if applicable or desired. The tampering detection controller 520 may also enable rechecks and/or adaptation, if desired. Finally, the tampering detection controller 520 can notify an administrator of results and can handle failures.

Figure 6:
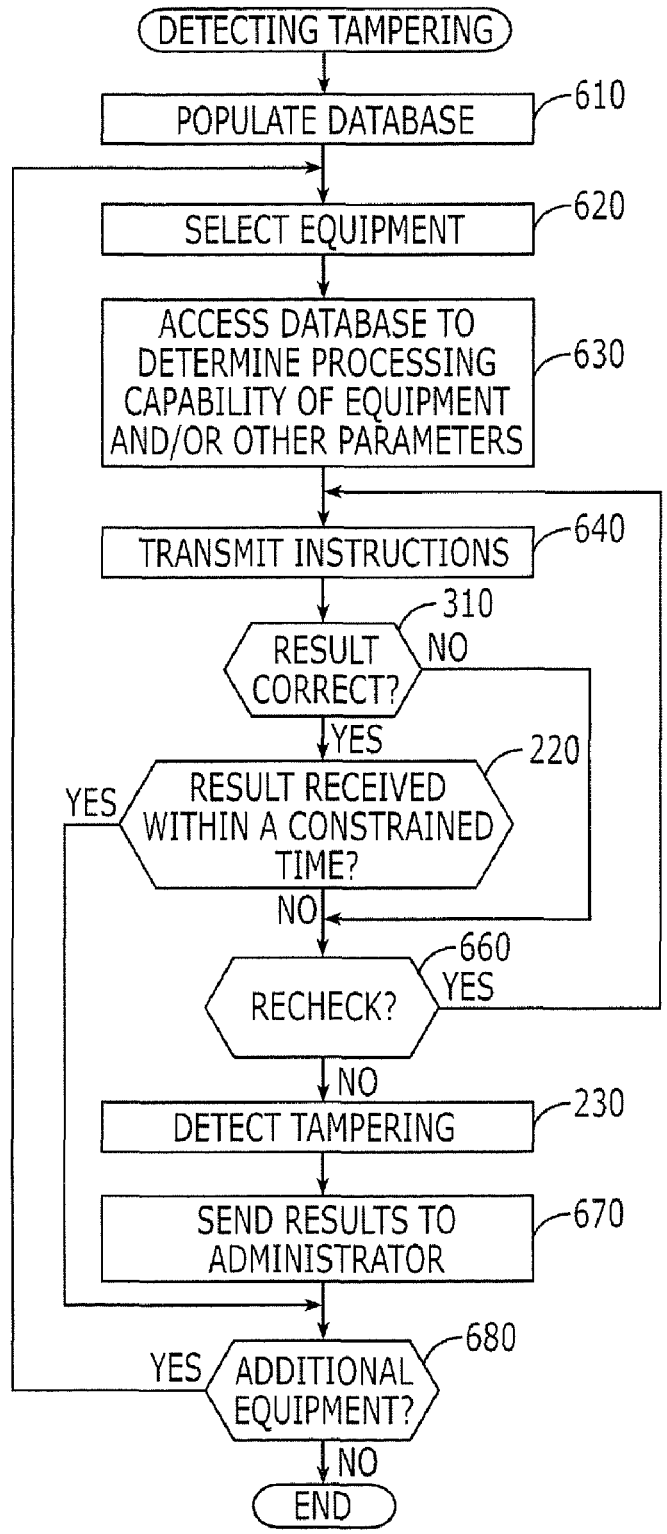
FIG. 6 is a flowchart of operations that may be performed according to various other embodiments of the present invention.

FIG. 6 is a flowchart of operations that may be performed according to various other embodiments of the invention. These operations may be performed, for example, by the tampering detection server 120 of FIG. 1 and/or by the tampering detection initiator 510, the tampering detection controller 520 and/or the equipment information database 530 of FIG. 5.

Referring to FIG. 6, at Block 610, a database, such as an equipment information database 530, is populated with electronic equipment information including processing capabilities. In some embodiments, memory capabilities also may be provided, along with any desired random data that is to be appended, as was already described. At Block 620, a piece of electronic equipment 110 is selected for tamper detecting. At Block 630, the database, such as the equipment information database 530, is accessed to determine the processing capability of the electronic equipment 110, based, for example, on the class to which it belongs. In some embodiments, the memory capability of the electronic equipment 110 also may be determined. At Block 640, the instructions are transmitted based on the class of the electronic equipment, including its processing capabilities and/or memory capabilities. Appropriate additional data, which may be random data as described herein, also may be appended in order to constrain the electronic equipment and reduce or preclude stored images from being used on the electronic equipment to fool tampering detection. In some embodiments, as part of transmitting instructions, all other activity/process on the electronic equipment 110 may be suspended temporarily while the instructions are being processed.

Continuing with the description of FIG. 6, at Block 310, a determination is made as to whether the result is correct and, if yes, a test is made at Block 220 as to whether the result was received within the constrained time. If not, then at Block 660, a determination is made as to whether rechecks are allowed. If so, then rechecks are performed successively until a configurable recheck limit is exceeded. In some embodiments, a random time may be waited between rechecks. On the other hand, if rechecks are no longer allowed at Block 660, then at Block 230, tampering is detected or tampering detection is malfunctioning. At Block 670, results are sent to an administrator. Finally, at Block 680, if there is additional equipment to check, the operations beginning at Block 620 are again performed.

It will also be understood that embodiments of the present invention may use adaptable parameters to adjust to variations in the environment, such as variations caused by network performance variables, such as time delay or latency, and changes therein. Adaptation may vary the parameters of the computational operations and/or time period adjustments. Thus, adaptation according to some embodiments of the present invention may utilize rechecks up to a configurable limit and, when adaptation is enabled, a greater recheck limit may be used. Parameters may be varied first if applicable given a particular instruction, and then the constrained time period may be extended if desirable. In other embodiments, the constrained time period may be extended first, and then parameters may be varied if desirable. Small changes in parameters may be used at first, and then changes may be successively increased if desirable. Maximum limits may be provided for parameter changes and for constrained time period extensions. These limits may be globally settable by an administrator for each check process. Once a maximum limit is exceeded, tampering may be detected if the response is still improper or invalid.

As was described above, embodiments of the present invention may be used to detect tampering of electronic equipment. In some scenarios, embodiments of the present invention may be used by a telecommunications services provider to check for tampering of home modems or gateways of DSL and home networking customers. Accordingly, the network 130 can be a packet switched network, the electronic equipment 110 can be any equipment that is configured to communicate information through a packet switched network, such as a cable modem and/or a digital subscriber line modem. A controller, such as a tampering detection controller 520, can access a database such as an equipment information database 530, to obtain desired information on the modems or gateways, such as the class of modem or gateway that is being used, as appropriate. The controller causes a tampering detection initiator, such as the tampering detection initiator 510, to send requests to each of the home modems or gateways in turn, with related specific information, such as random data, to be appended to that gateway's software/firmware, if appropriate. When the initiator receives a response, it provides associated information to the controller, which checks the time expired between each request and response, and determines if the result is valid. For invalid results returned within the allotted time period, the controller can send in a "tampering detected" message using, for example, one consolidated or multiple emails to an administrator, and can record the results/status in a log. For valid check results that are returned within the allotted time period, the controller can record "tampering not present" for those specific home modems or gateways in the log. For check results returned after the allotted time period has expired, and for no results returned, the controller for those home modems or gateways can initiate rechecks and adaptation if enabled or desired, recording "interim" status in the log.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of detecting tampering of electronic equipment comprising:
   instructing the electronic equipment to perform at least one computational operation at the electronic equipment to produce a result;
   receiving the result from the electronic equipment;
   detecting tampering of the electronic equipment in response to the result not being received within a constrained time of the instructing, even if the result that is received after the constrained time is correct; and
   at least partially disabling the electronic equipment upon the detecting tampering;
   wherein the instructing is preceded by:
      defining a plurality of computational operations and a corresponding plurality of results for corresponding classes of electronic equipment; and
      identifying a class to which the electronic equipment belongs; and
   wherein the instructing comprises instructing the electronic equipment to perform the at least one computational operation at the electronic equipment to produce the result, based on the class to which the electronic equipment belongs.

2. A method according to claim 1 wherein the electronic equipment includes memory and wherein the instructing comprises:
   instructing the electronic equipment to perform at least one hashing operation of contents of at least a portion of the memory to produce at least one hash value as the result.

3. A method according to claim 1 further comprising:
   detecting tampering of the electronic equipment if the result is not correct.

4. A method according to claim 1 wherein the electronic equipment includes memory and wherein the instructing comprises:
   instructing the electronic equipment to hash contents of a second portion of the memory with a hash of contents of a first portion of the memory to produce at least one hash value as the result.

5. A method according to claim 1 wherein the instructing is preceded by:
   disabling the electronic equipment from performing computations other than the at least one computational operation.

6. A method according to claim 1 wherein the electronic equipment includes memory and wherein the instructing comprises:
   determining a portion of the memory that may be subject to tampering; and
   instructing the electronic equipment to perform at least one hashing operation of contents of the portion of the memory that may be subject to tampering to produce at least one hash value as the result.

7. A method according to claim 1 wherein the electronic equipment includes memory and wherein the instructing comprises:

providing the electronic equipment with additional data to be stored in the memory; and instructing the electronic equipment to perform at least one hashing operation of contents of at least a portion of the memory and of the additional data stored in the memory to produce at least one hash value as the result.

8. A method according to claim 1 wherein the instructing, the receiving and the detecting are performed by a telecommunications service provider and wherein the electronic equipment comprises electronic equipment of a customer of the telecommunications service provider.

9. A method according to claim 1 wherein the electronic equipment includes memory and wherein the instructing comprises:

instructing the electronic equipment to repeatedly hash contents of a plurality of overlapping portions of the memory with one another, wherein the portions of the memory are determined by a first parameter and wherein the overlapping is determined by a second parameter.

10. A method according to claim 1 wherein the at least partially disabling comprises disconnecting the electronic equipment from a network by which it communicates.

11. A system for detecting tampering of electronic equipment comprising:

a tampering detection initiator that is configured to instruct the electronic equipment to perform at least one computational operation at the electronic equipment to produce a result, and to receive the result from the electronic equipment; and a tampering detection controller that is configured to detect tampering of the electronic equipment in response to the result not being received within a constrained time of the instructing, even if the result that is received after the constrained time is correct;

wherein the tampering detection initiator is further configured to:

define a plurality of computational operations and a corresponding plurality of results for corresponding classes of electronic equipment; and identify a class to which the electronic equipment belongs; and wherein the tampering detection initiator is further configured to instruct the electronic equipment to perform the at least one computational operation at the electronic equipment to produce the result, based on the class to which the electronic equipment belongs.

12. A system according to claim 11 wherein the tampering detection initiator is further configured to disable the electronic equipment from performing computations other than the at least one computational operation.

13. A system according to claim 11 wherein the electronic equipment includes memory and wherein the tampering detection initiator is configured to instruct the electronic equipment to perform at least one hashing operation of contents of at least a portion of the memory to produce at least one hash value as the result.

14. A system according to claim 11 wherein the tampering detection controller is also configured to detect tampering of the electronic equipment if the result is not correct.

15. A system according to claim 11 further comprising:

an equipment information database that is configured to store the instructions and additional data for the electronic equipment and to provide the instructions and the additional data to the tampering detection initiator; and wherein the tampering detection initiator is further configured to instruct the electronic equipment to perform at least one hashing operation of contents of at least a portion of a memory of the electronic equipment and of the data to produce at least one hash value as the result.

16. A system according to claim 15:

wherein the equipment information database is further configured to store a plurality of computational operations and a corresponding plurality of results for corresponding classes of the electronic equipment.

17. A computer program product that is configured to detect tampering of electronic equipment, the computer program product comprising a non-transitory computer usable storage medium having computer-readable program code embodied in the non-transitory medium, the computer-readable program code comprising:

computer-readable program code that is configured to instruct the electronic equipment to perform at least one computational operation at the electronic equipment to produce a result;

computer-readable program code that is configured to receive the result from the electronic equipment; and computer-readable program code that is configured to detect tampering of the electronic equipment in response to the result not being received within a constrained time of the instructing, even if the result that is received after the constrained time is correct;

wherein the computer-readable program code that is configured to instruct comprises:

computer-readable program code that is configured to define a plurality of computational operations and a corresponding plurality of results for corresponding classes of electronic equipment;

computer-readable program code that is configured to identify a class to which the electronic equipment belongs; and computer-readable program code that is configured to instruct the electronic equipment to perform the at least one computational operation at the electronic equipment to produce the result, based on the class to which the electronic equipment belongs.

18. A computer program product according to claim 17 wherein the electronic equipment includes memory and wherein the computer-readable program code that is configured to instruct comprises:

computer-readable program code that is configured to instruct the electronic equipment to perform at least one hashing operation of contents of at least a portion of the memory to produce at least one hash value as the result.

19. A computer program product according to claim 17 further comprising:

computer-readable program code that is configured to detect tampering of the electronic equipment if the result is not correct.

20. A computer program product according to claim 17 wherein the electronic equipment includes memory and wherein the computer-readable program code that is configured to instruct comprises:

computer-readable program code that is configured to provide the electronic equipment with additional data to be stored in the memory; and computer-readable program code that is configured to instruct the electronic equipment to perform at least one hashing operation of contents of at least a portion of the memory and of the additional data stored in the memory to produce at least one hash value as the result.

* * * * *